US007008103B2

(12) United States Patent
MacDougall

(10) Patent No.: US 7,008,103 B2
(45) Date of Patent: Mar. 7, 2006

(54) METHOD AND APPARATUS FOR TEMPERATURE SENSING UTILIZING OPTICAL FIBER

(75) Inventor: Trevor MacDougall, Simsbury, CT (US)

(73) Assignee: Weatherford/Lamb, Inc., Houston, TX (US)

(*) Notice: Subject to any disclaimer, the term of this patent is extended or adjusted under 35 U.S.C. 154(b) by 0 days.

(21) Appl. No.: 11/168,809

(22) Filed: Jun. 28, 2005

(65) Prior Publication Data

US 2005/0254550 A1    Nov. 17, 2005

Related U.S. Application Data

(63) Continuation of application No. 10/397,754, filed on Mar. 26, 2003, now Pat. No. 6,910,803.

(51) Int. Cl.
*G01K 11/32* (2006.01)
*G02B 6/50* (2006.01)

(52) U.S. Cl. ............... 374/117; 374/136; 374/162; 385/12; 356/44; 356/365; 356/477; 250/256; 250/227.18; 702/6

(58) Field of Classification Search ............ None
See application file for complete search history.

(56) References Cited

U.S. PATENT DOCUMENTS

| 4,767,219 A | * | 8/1988 | Bibby ..................... 374/137 |
| 5,383,207 A | * | 1/1995 | Culverhouse et al. ......... 372/28 |
| 5,483,607 A | * | 1/1996 | O'Keefe ..................... 385/12 |
| 6,555,807 B1 | * | 4/2003 | Clayton et al. ........ 250/227.16 |
| 6,698,919 B1 | * | 3/2004 | Chi et al. .................. 374/161 |
| 6,913,079 B1 | * | 7/2005 | Tubel ......................... 250/256 |
| 2003/0035099 A1 | * | 2/2003 | Kobayashi et al. ......... 356/73.1 |

FOREIGN PATENT DOCUMENTS

| GB | 2234585 | * | 2/1991 |
| JP | 04077641 A | * | 3/1992 |
| WO | WO 2093120 | * | 11/2002 |

OTHER PUBLICATIONS

Sakairi, Y; Uchiyama, H; Li, Zhi Xien; Adachi, S. "System for measuring temperature and strain separately by BOTDR and OTDR," Proc. SPIE vol. 4920, pp. 274-284, 2002, no month.*
Tanaka, Y; Ogusu, K. "Polarization dependence of depolarized guided acoustic-wave Brillouin scattering detected after an analyzer," Journal-of-Optical-Communications (Germany), vol. 21, No. 3, p. 82-85, Jun. 2000.*
Tanaka, Y; Ogusu, K. "Polarization dependence of amplitude modulation by guided acoustic-wave Brillouin scattering," Proc. SPIE vol. 3746, pp. 116-119, 1999, no month.*
Xiaoyi-Bao; DeMerchant-M; Brown-A; Bremner-T. "Tensile and compressive strain measurement in the lab and field with the distributed Brillouin scattering sensor," Journal-of-Lightwave-Technology (USA), vol. 19, No. 11, p. 1698-704, Nov. 2001.*

* cited by examiner

*Primary Examiner*—Gail Verbitsky
*Assistant Examiner*—Stanley J. Pruchnic, Jr.

(57) ABSTRACT

A method and apparatus for sensing temperature using optical fiber is provided. In one embodiment, a method for sensing temperature using optical fiber includes launching a polarized optical signal having sufficient intensity to produce Brillouin scattering of the signal into a polarization maintaining optical fiber, receiving a first signal reflected from the launched signal, receiving a second signal reflected from the launched signal; and resolving a metric indicative of temperature from the first and second received signals. The method is particularly useful for sensing temperature in hazardous locations such as down hole gas and oil field applications or other applications where minimization of strain effects to signal transmission is desired.

17 Claims, 2 Drawing Sheets

METHOD AND APPARATUS FOR TEMPERATURE SENSING UTILIZING OPTICAL FIBER

CROSS-REFERENCE TO RELATED APPLICATIONS

This application is a continuation of U.S. patent application Ser. No. 10/397,754, filed Mar. 26, 2003, which is now U.S. Pat. No. 6,910,803. The aforementioned related patent application is herein incorporated by reference in its entirety.

BACKGROUND OF THE INVENTION

1. Field of the Invention

Embodiments of the invention generally relate to a method and apparatus for temperature sensing utilizing optical fiber.

2. Background of the Related Art

Transmitting information, such as temperature, through optical fibers utilized in down hole gas and oil (e.g., petroleum) field drilling applications is becoming more widely accepted as gas and oil field producers embrace the advantages of optical fiber systems over conventional metallic conductors. For example, optical fiber sensing systems exhibit increased long-term reliability over conventional conductors, often having a useful service life up to and exceeding four times the service life of conventional sensing systems utilizing metallic conductors, thus allowing efficient petroleum removal to continue long into the life of wells utilizing optical sensing systems, and thereby maximizing the profitability of older wells.

One type of fiber optic temperature sensing system exploits the Brillouin shift in reflected wavelengths (or frequencies) of high powered optical signals traveling in optical fibers. Such sensing systems generally include a signal generator and detection circuit coupled to an optical fiber housed in a cable suitable for down hole oil and gas field service. A high powered signal is launched down the optical fiber by the signal generator. As the signal propagates through the optical fiber, the intensity of the signal produces a temporary property change in the portion of the fiber having the signal pass through. The property change causes a reflection of the signal back through the optical fiber to the detection circuit.

The optical detection circuit compares the wavelengths (or frequencies) of transmitted and reflected signals to determine the temperature at the portion of the optical fiber from which the signal was reflected. As the rate of signal propagation through the optical fiber is known, the delay between signal generation and the return of the reflected signal is indicative of the position of the portion of the optical fiber reflecting the signal.

As the optical fiber is often routed deep inside the well, the optical fiber is subjected to considerable strain due to environmental conditions within the well along with the weight of the cable itself. As the characteristics (i.e., frequency or wavelength) of the reflected signal are influenced by the strain applied to the optical fiber, optical temperature measuring systems must predict the strain contribution to the characteristics of the reflected signal in order to obtain an accurate temperature reading.

However, predicting the contribution of strain to the wavelength or frequency change of the signal is difficult. For example, the large difference in thermal expansion between pipes and other components to which the optical fiber is housed or coupled to may subject the optical fiber to strain if insufficient slack or binding of the optical fiber occurs in the hot well environment. Moreover, as the temperature is not constant throughout the well, the strain induced by temperature may vary along the length of the optical fiber. Additionally, the temperature at various locations within the well usually changes over time, further complicating predictions of strain within the optical fiber and limiting the accuracy of temperature measurements using optical fiber.

Therefore, there is a need for an improved method and apparatus for sensing temperature using optical fiber.

SUMMARY OF THE INVENTION

Methods and apparatuses for sensing temperature using optical fiber are provided. In one embodiment, a method for sensing temperature using optical fiber includes launching a polarized optical signal having sufficient intensity to produce Brillouin scattering of the signal into a polarization maintaining optical fiber (e.g., a birefringent fiber), receiving a first signal reflected from the launched signal, receiving a second signal reflected from the launched signal, and resolving a metric indicative of temperature from the first and second received signals. The method is particularly useful for sensing temperature in hazardous locations such as down hole gas and oil field applications or other applications where minimization of strain effects to signal transmission is desired.

BRIEF DESCRIPTION OF THE DRAWINGS

A more particular description of the invention, briefly summarized above, may be had by reference to the embodiments thereof that are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, wherever possible, to designate identical elements that are common to the figures.

DETAILED DESCRIPTION

Figure 1:
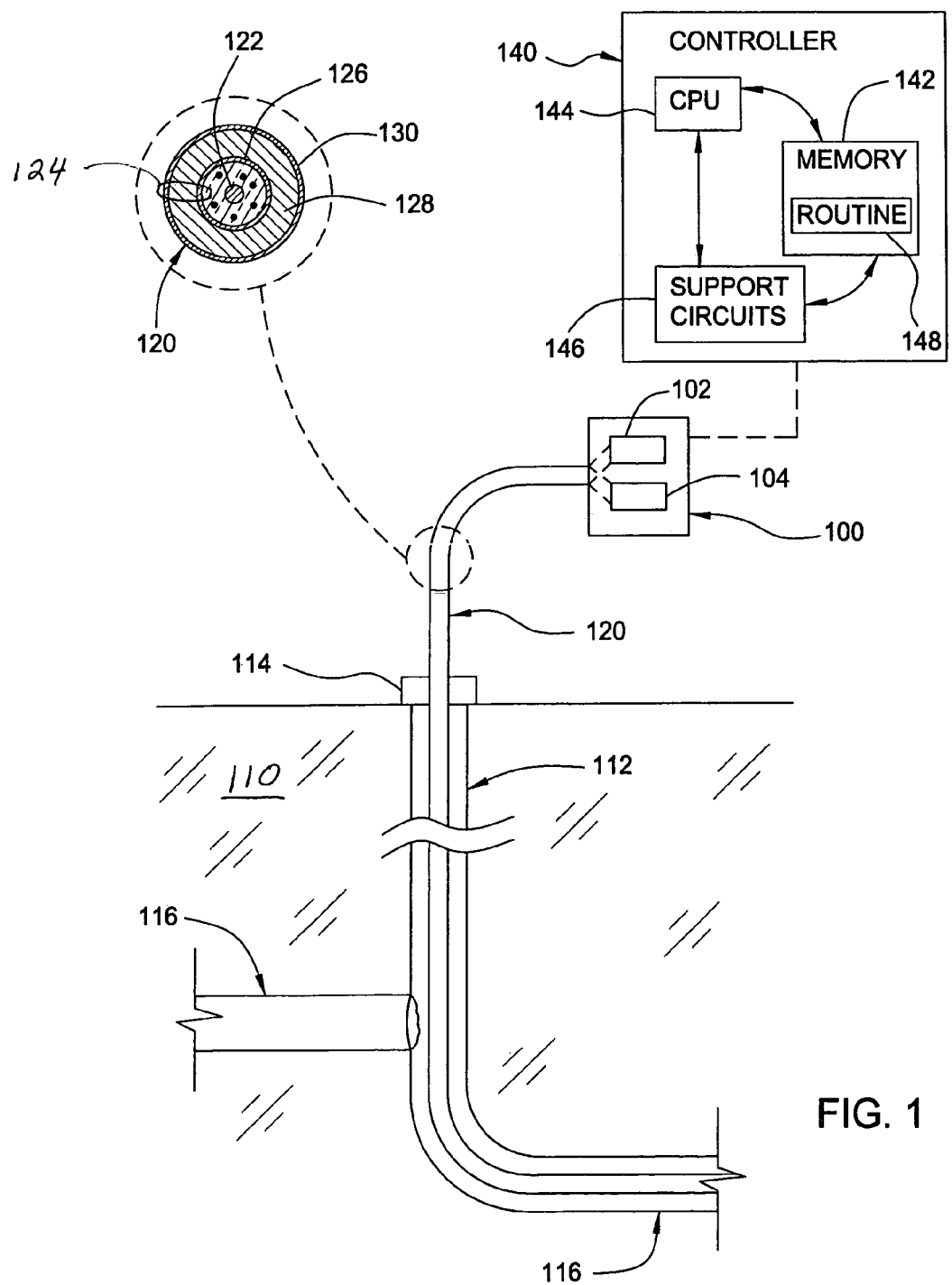
FIG. 1 is a simplified schematic of an oil or gas well having an optical fiber temperature sensing system adapted to sense temperature using a method of the present invention.

FIG. 1 is a simplified schematic of an oil or gas well 110 having an optical fiber temperature sensing system 100 adapted to sense temperature using a method and apparatus of the present invention. The well 110 includes a main bore 112 extending from a wellhead 114. One or more secondary bores 116 may branch out from the main bore 112.

The temperature sensing system 100 exploits predefined differences and similarities between two optical signal paths disposed in an optical conductor to resolve temperature information. In one embodiment, the sensing system 100 includes a signal generator 102 and a detection circuit 104 that are coupled to an optical cable 120 that extends down at least the main bore 112 of the well 100. The optical cable 120 includes one or more polarization maintaining optical fibers 122 disposed in a protective sleeve 124 suitable to protect the optical fibers 122 in a down hole well environment. In some applications, the optical cable 120 may extend up to and exceed 12 kilometers through main bore 112 and/or at least one of the secondary bores 116 of the well 110.

In one embodiment, the sleeve 124 includes an inner tube 126 seam welded around the one or more optical fibers 122, a spacer 128 and an outer metal tube 130. The outer metal tube 130 is welded around the spacer 128 that is disposed between the inner and outer tubes 126, 130. A barrier material (not shown) having low hydrogen permeability may be disposed on at least one of the tubes 126, 130.

In one embodiment, the optical fiber 122 is a high birefringent fiber. The optical fiber 122 generally has at least two modes or axes for polarized signal travel, wherein the Brillouin shift in wavelength of a high powered signal reflected in each axis may be expressed by:

$$\lambda total_A = \lambda temp_A + \lambda strain_A \qquad (1)$$

$$\lambda total_B = \lambda temp_B + \lambda strain_B \qquad (2)$$

where:
- $\lambda total_A$ is the total shift in wavelength between the generated and reflected signal traveling in the first axis of the optical cable;
- $\lambda total_B$ is the total shift in wavelength between the generated and reflected signal traveling in the second axis of the optical cable;
- $\lambda temp_A$ is the shift in wavelength between the generated and reflected signal traveling in the first axis of the optical cable due to temperature;
- $\lambda temp_B$ is the shift in wavelength between the generated and reflected signal traveling in the second axis of the optical cable due to temperature;
- $\lambda strain_A$ is the shift in wavelength between the generated and reflected signal traveling in the first axis of the optical cable due to strain in the optical fiber; and
- $\lambda strain_B$ is the shift in wavelength between the generated and reflected signal traveling in the second axis of the optical cable due to strain in the optical fiber.

The optical fiber 122 is fabricated so that the effects of strain on signal propagation are substantially equal along the first and second axes, while the effects of temperature are different along each axis. This may be accomplished by selecting a birefringent fiber having geometrical features of the fiber core and/or material features in the glaze of glass surrounding the core that minimize the differences in the effects of strain to signal propagation between the polarization states while maintaining an appreciable difference in the effects of temperature to signal propagation between the polarization states. As the effects of strain to signal propagation in the first axis approaches the effects of strain in the second axis, the contribution of strain to the wavelength shift in the reflected signal diminishes, thus increasing the accuracy and precision of the temperature measurement. In one embodiment, the effects of strain to signal propagation in the first axis substantially is within about ±5 percent the effect of strain in the second axis. In another embodiment, the effects of strain to signal propagation in the first axis substantially equals the effects of strain in the second axis to maximize the accuracy of the temperature measurement.

Thus, as $\lambda strain_A$ approaches and equals $\lambda strain_B$ (e.g., $\lambda strain_A = \lambda strain_B$), equations (1) and (2) may be combined and described as:

$$\lambda total_A - \lambda total_B = \lambda temp_A - \lambda temp_B \qquad (3)$$

$$\lambda total_A - \lambda total_B = (CT2 - CT1) * \lambda Brillouin(T - Tr) \qquad (4)$$

where:
- CT1 is a coefficient of wavelength change due to temperature at a reference temperature Tr, and, in one embodiment, CT1 is $0.65*10^{-7}$ at 25 degrees Celsius;
- CT2 is a coefficient of wavelength change due to temperature at the reference temperature Tr, and, in one embodiment, CT2 is $1.0*10^{-7}$ at 25 degrees Celsius; and
- Brillouin(T-Tr)=0.0002 nm/degrees Celsius, where T is the measured temperature and Tr is the reference temperature (25 degrees Celsius in the present example).

CT2-CT1, being a material property specific to an optical fiber, may be respresented as a constant K for a predefined optical fiber. Thus, Equation (4) may also be expressed as:

$$T = (\lambda total_A - \lambda total_B)/0.0002K + Tr \qquad (5)$$

Therefore, by entering the measured values for for $\lambda total_A$ and $\lambda total_B$ obtained utilizing the detection circuit, the value K known for a predefined optical fiber, the temperature T to be resolved.

In another embodiment of the method, the effects on the signal by the temperature of the optical fiber may be configured to be substantially equal, while the strain effects are different. Thus, as $\lambda temp_A$ approaches and equals $\lambda temp_B$ (e.g., $\lambda temp_A = \lambda temp_B$, or within about ±5 percent), equations (1) and (2) may be combined and described as:

$$\lambda total_A - \lambda total_B = \lambda strain_A - \lambda strain_B \qquad (6)$$

$$\lambda total_A - \lambda total_B = (CS2 - CS1) * \lambda Brillouin(\epsilon - \epsilon r) \qquad (7)$$

where:
- CS1 is a coefficient of wavelength change due to strain at a reference temperature Tr;
- CS2 is a coefficient of wavelength change due to strain at the reference temperature Tr; and
- Brillouin($\epsilon - \epsilon r$)=0.0002 nm/100 $\mu\epsilon$, where $\epsilon$ is the measured strain and $\epsilon r$ is the reference strain.

CS2-CS1, being a material property specific to an optical fiber, may be represented as a constant Y for a predefined optical fiber. Thus, Equation (7) may also be expressed as:

$$T = (\lambda total_A - \lambda total_B)/0.0002Y + \epsilon r \qquad (8)$$

Therefore, by entering the measured values for $\lambda total_A$ and $\lambda total_B$ obtained utilizing the detection circuit, and the value Y known for a predefined optical fiber, the strain $\epsilon$ to be resolved. The resolved value for strain $\epsilon$ may now be substituted back in equations (1) or (2) to resolve for temperature.

Temperature may alternatively be resolved by examining the Brillouin shift in frequency utilizing the same equations and method describe above, substituting changes in frequency for changes in wavelengths.

The signal generator 102 is configured to launch an optical signal into the optical fiber 122. The signal generator 102 may produce a single polarized optical signal or may produce at least two substantially identical signals orientated on different planes of sufficient intensity to produce Brillouin scattering of the signal as the signal propagates through the optical fiber 122 down the well 110. In one embodiment, the intensity of the signal is at least about 100 microwatts.

The detection circuit 104 is configured to receive at least two reflected signals returning on separate paths through the optical fiber 122 of the cable 120. The detection circuit 104 may include one or more photodiodes for converting the optical signal to a digital signal. Both the signal generator 102 and the detection circuit 104 are coupled to a controller 140 that manages the signal generation, collection and interpretation.

The controller 140 facilitates control of the optical fiber temperature sensing system 100 described above and includes a central processing unit (CPU) 144, support circuits 146 and memory 142. The CPU 144 may be one of any form of general purpose computer processor that can be used in an industrial setting configured to interface with the signal generator 102 and detection circuits 104. The memory 142 is coupled to the CPU 144. The memory 142, or computer-readable medium, may be one or more of readily available memory such as random access memory (RAM), read only memory (ROM), floppy disk, hard disk, or any other form of digital storage, local or remote. The support circuits 146 are coupled to the CPU 144 for supporting the processor in a conventional manner. These circuits include cache, power supplies, clock circuits, input/output circuitry and subsystems, and the like.

A temperature sensing method 200, described with reference to FIG. 2 below, is generally stored in the memory 142, typically as a software routine 148. The software routine 148 may also be stored and/or executed by a second CPU (not shown) that is remotely located from the hardware being controlled by the CPU 144. When the routine 148 is executed by the CPU 146, the controller 140 provides instructions to the signal generator 102 and receives data from the detection circuit 104, from which a metric of temperature at a predefined position along the optical fiber 122 may be resolved that corresponds depth and/or location within the well 110.

Figure 2:
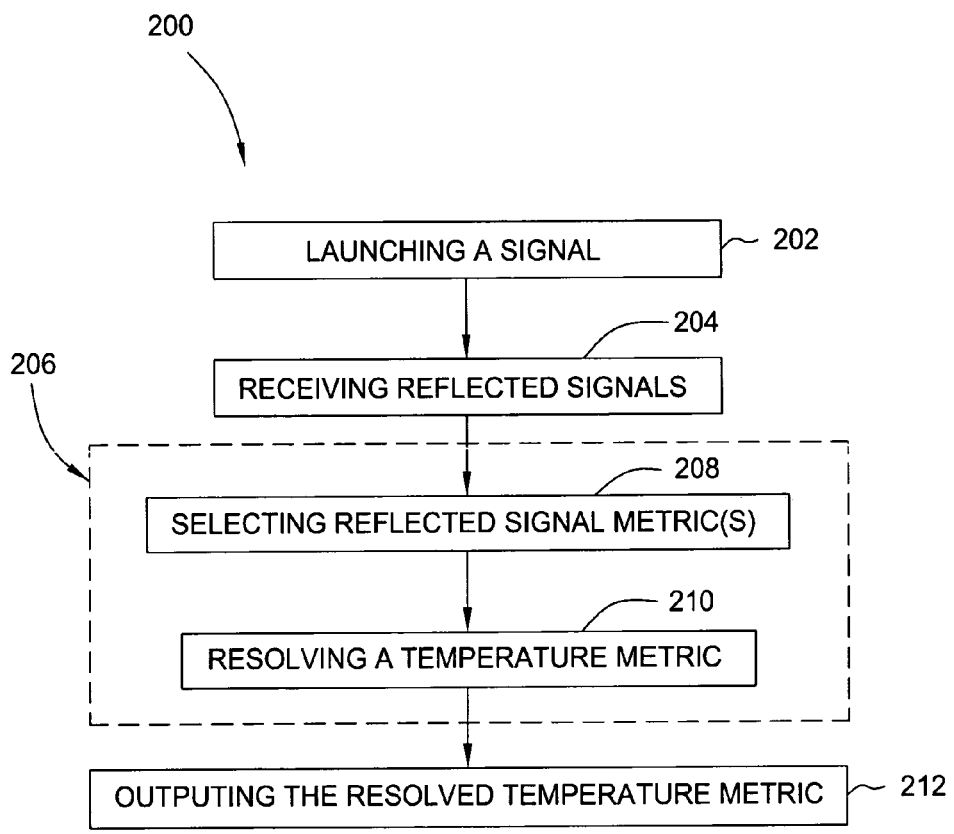
FIG. 2 is a flow diagram of one embodiment of a method for sensing temperature using optical fiber.

FIG. 2 is a flow diagram of one embodiment of the method 200 for sensing temperature using optical fiber. The method 200 begins at step 202 by launching a light pulse of at least one polarized optical signal from the signal generator 102 of sufficient intensity to produce Brillouin scattering of the signal as the signal propagates through the optical fiber 122 down the well 110 from the wellhead 114. As the signal enters the optical fiber 122, the signal propagates separately in each polarization maintaining transmission path, generating a Brillouin reflection that travels back through the optical fiber 122 to the detection circuit 104.

The step 202 may include launching a single polarized signal that travels separately in each of the optical fiber's signal propagation transmission paths. Alternatively, the step 202 may include launching separate polarized signals in each of the optical fiber's signal transmission paths.

At step 204, the reflected signals are received by the detection circuit 104. The detection circuit 104 converts each of the optical signals into respective metrics indicative of the wavelength and/or frequency of each reflected signal. The reflected signal metrics are provided to the controller 104 in at least one of analog or digital form.

At step 206, the controller 104 analyses the reflected signal metrics to determine a metric indicative of temperature at a predefined position along the optical fiber 122. The analysis step 206 includes selecting reflected signal metric at step 208 and resolving a temperature metric at step 210.

The step 208 of selecting reflected signal metric allows for a selection of which portion of the well 110 temperature data will be resolved. In other words, step 208 chooses at which depth or range of depths/locations within the well 110 will be analyzed for temperature information. In one embodiment, each reflected signal metric is assigned a time stamp corresponding to the time elapsed between the launch of the optical signal from the signal generator 102 and the arrival of the reflected signal at the detection circuit 104.

Since the signal propagates through the optical fiber 122 at a known rate and as the signal is being reflected continuously as the signal propagates through the optical fiber 122, the arrival time of each reflected signal corresponds to a specific fiber position, and thus, a specific location along the main or secondary bore 112, 116 within the well 110. Therefore, if temperature information is desired from a predefined location within the well 110, reflected signal metrics associated by the time stamp to the predefined location is selected for resolving a temperature metric for that location at step 210. Alternatively, temperature information along a predefined area of the well 110 may be obtained by selecting a reflected signal metrics associated by the time stamps to that region, or any other region of the well 110, including the entire temperature profile of the well 110.

At step 210, the temperature metric is resolved for the reflected metrics selected at step 208. In one embodiment, the step of resolving a temperature metric includes comparing the signal metrics from the two transmission paths. In other embodiments, the temperature metric may be resolved by solving equations (5) and/or (8). At step 212, the controller 140 outputs the resolved temperature metric and the metric is saved to the local memory 142 or exported to another device, for example, a display or remote storage device.

Thus, a method has been presented for accurately sensing temperature in hazardous locations such as down hole oil and gas field applications utilizing optical fiber. The method advantageously minimizes measurement uncertainty due to strain effects on the optical fiber associated with conventional optical sensing systems. It is also contemplated that the method for sensing may also be adapted for other subsurface applications (i.e., non-oil/gas field applications), applications involving temperature measurement over long distances, and other applications where strain effects on optical fiber signal conductors may introduce measurement error.

Although several preferred embodiments which incorporate the teachings of the present invention have been shown and described in detail, those skilled in the art can readily devise many other varied embodiments that still incorporate these teachings.

What is claimed is:

1. A method for sensing temperature using optical fiber, comprising:

launching a polarized optical signal into a polarization maintaining optical fiber having a first and a second axis for polarized signal travel, wherein the fiber is selected so that effects of temperature on signals traveling in the first and second axes are substantially the same while effects of strain on signals traveling in the first and second axes are substantially different;

receiving a first signal reflected, along the first axis, from the launched signal due to Brillouin scattering;

receiving a second signal reflected, along the second axis, from the launched signal due to Brillouin scattering; and resolving a metric indicative of temperature from the first and second reflected signals.

2. The method of claim 1, wherein the optical fiber is a birefringent fiber.

3. The method of claim 1, wherein launching the optical signal further comprises:

launching the first signal down the first axis of the optical fiber; and launching the second signal down the second axis of the optical fiber.

4. The method of claim 3, wherein resolving the metric indicative of temperature comprises determining an elapsed time between the launch of the optical signal and the receipt of the first signal.

5. The method of claim 1, wherein resolving the metric indicative of temperature comprises selecting a predetermined one of a plurality of returning signals to analyze.

6. The method of claim 5, wherein selecting the predetermined one of the plurality of returning signals to analyze comprises determining a period between the launch and receipt of the signal.

7. The method of claim 1, wherein resolving the metric indicative of temperature comprises comparing changes in characteristics of at least one of wavelength of the signals returning through the first axis and the second axis for polarized signal travel.

8. The method of claim 7, wherein the metric indicative of temperature is expressed as:

$$T=(\lambda total_A - \lambda total_B)/0.0002M + R$$

where:
T is the sensed temperature;
$\lambda total_A$ is a detected shift in the characteristic in the first signal;
$\lambda total_B$ is a detected shift in the characteristic in the second signal;
M is a predefined material property specific to the signal paths of the optical fiber; and
R is a reference value for temperature.

9. The method of claim 8, wherein M is expressed as:

$$CS2-CS1$$

where:
CS1 is a coefficient of wavelength or frequency change due to strain at the reference temperature R; and
CS2 is a coefficient of wavelength or frequency change due to strain at the reference temperature R.

10. A method for sensing temperature using optical fiber, comprising:
launching a polarized optical signal having sufficient intensity to produce Brillouin scattering of the signal into a polarization maintaining birefringent optical fiber disposed in a cable suitable for down hole petroleum well use, wherein signal effects due to temperature in two polarization maintaining transmission paths of the birefringent optical fiber are substantially equal, while signal effects due to strain in the two polarization maintaining transmission paths of the birefringent optical fiber are substantially different;
receiving a first signal in a first polarization maintaining transmission path reflected from the launched signal due to Brillouin scattering;
receiving a second signal in a second polarization maintaining transmission path reflected from the launched signal due to Brillouin scattering; and
resolving a metric indicative of temperature from the first and second received signals.

11. The method of claim 10, wherein resolving the metric indicative of temperature comprises comparing changes in at least one of frequency or wavelength of the two signals returning through the two polarization maintaining transmission paths of the optical fiber.

12. The method of claim 10, wherein the changes in wavelength is expressed as:

$$T=(\lambda total_A - \lambda total_B)/0.0002M + R$$

where:
T is the sensed temperature;
$\lambda total_A$ is a detected shift in the characteristic in the first signal;
$\lambda total_B$ is a detected shift in the characteristic in the second signal;
M is a predefined material property specific to the signal paths of the optical fiber; and
R is a reference value for temperature.

13. The method of claim 12, wherein M is expressed as:

$$CS2-CS1$$

where:
CS1 is a coefficient of wavelength or frequency change due to strain at the reference temperature R; and
CS2 is a coefficient of wavelength or frequency change due to strain at the reference temperature R.

14. A system for sensing temperature using optical fiber, comprising:
an optical fiber suitable for oil and gas well application having at least a first and second polarization maintaining signal paths, wherein signal transmission effects due to strain are different between the first and second signal paths, and signal transmission effects due to temperature are substantially equal between the first and second signal paths;
a light source for launching at least one polarized optical signal having sufficient intensity to produce Brillouin scattering of the signal into the optical fiber;
an optical signal detection circuit for receiving signals traveling in the first and second signal paths reflected due to Brillouin scattering from the signal launched into the optical fiber; and
a computer for resolving a metric indicative of temperature from the first and second received signals.

15. The system of the claim 14, wherein the computer is configured to resolve a metric indicative of temperature that is expressed as:

$$T=(\lambda total_A - \lambda total_B)/0.0002M + R$$

where:
T is the sensed temperature;
$\lambda total_A$ is a detected shift in the characteristic in the first signal;
$\lambda total_B$ is a detected shift in the characteristic in the second signal;
M is a predefined material property specific to the signal paths of the optical fiber; and
R is a reference value for temperature.

16. The system of claim 15, wherein M is expressed as:

$$CS2-CS1$$

where:
CS1 is a coefficient of wavelength or frequency change due to strain at the reference temperature R; and
CS2 is a coefficient of wavelength or frequency change due to strain at the reference temperature R.

17. The system of claim 14, wherein the optical fiber is a birefringent fiber.

* * * * *